(12) United States Patent
Deng

(10) Patent No.: US 10,756,385 B2
(45) Date of Patent: Aug. 25, 2020

(54) QUINARY ELECTROLYTES FOR HIGH POWER LITHIUM ION BATTERIES

(71) Applicant: GM GLOBAL TECHNOLOGY OPERATIONS LLC, Detroit, MI (US)

(72) Inventor: Shawn Deng, Shanghai (CN)

(73) Assignee: GM Global Technology Operations LLC, Detroit ( * ) Notice: Subject to any disclaimer, the term of this patent is extended or adjusted under 35 U.S.C. 154(b) by 134 days.

(21) Appl. No.: 15/780,314

(22) PCT Filed: Jan. 15, 2016

(86) PCT No.: PCT/CN2016/071008
§ 371 (c)(1),
(2) Date: May 31, 2018

(87) PCT Pub. No.: WO2017/120884
PCT Pub. Date: Jul. 20, 2017

(65) Prior Publication Data
US 2018/0366771 A1    Dec. 20, 2018

(51) Int. Cl.
*H01M 10/052* (2010.01)
*H01M 10/0525* (2010.01)
(Continued)

(52) U.S. Cl.
CPC .... *H01M 10/0525* (2013.01); *C01G 45/1242* (2013.01); *H01M 4/485* (2013.01);
(Continued)

(58) Field of Classification Search
CPC ...... H01M 4/485; H01M 4/505; H01M 4/525; H01M 10/0525; H01M 10/0569;
(Continued)

(56) References Cited

U.S. PATENT DOCUMENTS

| 2012/0007560 A1* | 1/2012 | Smart | H01M 10/0568 320/127 |
|---|---|---|---|
| 2012/0107700 A1* | 5/2012 | Deguchi | H01M 10/0525 429/338 |

(Continued)

FOREIGN PATENT DOCUMENTS

CN    1731604 A    *    2/2006

OTHER PUBLICATIONS

Machine translation of CN1790800 (no date).*
Machine translation of CN-1731604-A (no date).*

*Primary Examiner* — Amanda C. Walke
(74) *Attorney, Agent, or Firm* — Reising Ethington P.C.

(57) ABSTRACT

High power lithium-ion batteries are disclosed. Such batteries may be used, for example, as the sole electric starter motor power sources for automotive vehicles powered by multi-cylinder engines with reciprocating pistons when the vehicles are to be operated in an engine start-stop mode to conserve fuel. Such batteries typically utilize non-aqueous solutions of lithium salts, such as $LiPF_6$ or $LiBF_4$, in combination with durable lithium intercalating electrodes. In accordance with this disclosure the performance of the battery's electrolyte and cells over a wide ambient temperature range is enhanced by a mixture of five miscible solvents formed of lower alkyl moieties. The quinary solvent mixture comprises two cyclic alkyl carbonates, two linear alkyl carbonates, and with a major portion of an alkyl ester.

18 Claims, 3 Drawing Sheets

(51) Int. Cl.
    *H01M 10/0569*     (2010.01)
    *C01G 45/12*     (2006.01)
    *H01M 4/485*     (2010.01)
    *H01M 4/505*     (2010.01)
    *H01M 4/525*     (2010.01)
    *H01M 10/0585*     (2010.01)
    *H01M 4/02*     (2006.01)

(52) U.S. Cl.
    CPC ........... *H01M 4/505* (2013.01); *H01M 4/525* (2013.01); *H01M 10/0569* (2013.01); *H01M 10/0585* (2013.01); *C01P 2002/32* (2013.01); *H01M 2004/027* (2013.01); *H01M 2004/028* (2013.01); *H01M 2220/20* (2013.01); *H01M 2300/0042* (2013.01); *Y02E 60/122* (2013.01); *Y02T 10/7011* (2013.01)

(58) Field of Classification Search
    CPC ........ H01M 10/0585; H01M 2004/027; C01G 45/1242; C01P 2002/32
    USPC ....................................................... 429/322
    See application file for complete search history.

(56) References Cited

U.S. PATENT DOCUMENTS

| | | | | |
|---|---|---|---|---|
| 2013/0004862 | A1* | 1/2013 | Miyoshi | C07D 327/10 429/337 |
| 2015/0364762 | A1* | 12/2015 | Kim | H01M 4/525 429/338 |
| 2017/0133676 | A1* | 5/2017 | Kodato | H01M 4/505 |

* cited by examiner

QUINARY ELECTROLYTES FOR HIGH POWER LITHIUM ION BATTERIES

TECHNICAL FIELD

Lithium-ion batteries using selected lithium-intercalating anode and cathode materials, and fluorinated lithium salts as electrolytes, provide high power levels over a wide range of ambient temperatures. For example, such batteries are candidates for providing electrical energy for vehicle starting motors for continual start-stop-restart operation of hydrocarbon-fueled, reciprocating piston internal combustion engines. The high power demands of stop-restart vehicle engine operation (and other battery applications) over a wide ambient temperature range are better enabled by using a five-component liquid solvent mixture for the lithium salt electrolyte.

BACKGROUND OF THE INVENTION

The material presented as background information in this section of the specification is not necessarily prior art.

There are an increasing number of applications for lithium-ion batteries requiring high power levels. Many such battery applications require high power levels over a wide range of ambient temperatures.

For example, designers and manufacturers of automotive vehicles continually strive to improve the fuel economy of their gasoline fueled (or gasoline and alcohol fueled) or diesel fueled, multi-cylinder, reciprocating piston, internal combustion engine-driven vehicles. One approach for reducing fuel consumption in the operation of such vehicles is to stop engine operation each time that the vehicle comes to a complete stop (even a brief stop) and, then, to restart the engine when, for example, the operator releases the brake pedal or presses the gas pedal. Such continual start-stop-restart operations (start-stop, hereafter in this specification) of the vehicle engines are often managed (in different ways) by an electronic computer control module and sensors which react to the operator's stopping and starting commands.

In the many decades of usage of internal combustion engine powered vehicles, the starting of the vehicle engine was usually accomplished using a small electric starting motor powered by an electrochemical battery based on lead-lead oxide electrodes, with lead sulfate being the discharge product on each electrode, and a water-sulfuric acid electrolyte. Indeed, lead-acid batteries comprising six such cells, providing 12-14 volts DC, (called starting, lighting, and ignition batteries or SLI batteries) served to power vehicles' ignition systems, lighting systems, entertainment centers, and the like, in addition to powering engine starting. Then, during periods of suitably long engine operation, an engine-powered alternator (or generator) re-charged the vehicle's lead-acid SLI battery.

Now it is found that, with many vehicle systems for engine start-stop operation as a regular driving mode, the familiar lead-acid battery is not well suited for such frequent engine stopping and re-starting, particularly over a wide ambient temperature range. The frequent demands for relatively high motor power for engine starting and the short intervening periods for re-charging adversely affect the life and utility of lead-acid batteries.

Lithium-ion batteries offer high power density and durability for many different consumer and powered transport operations. Now, additionally, they are being considered for these continual engine start-stop vehicle applications. Lithium-ion batteries have been considered having many different combinations of electrode materials and electrolytes. However, the perceived requirements are quite demanding for a battery that is to be used on an automotive vehicle in a wide range of ambient temperature conditions for continually powering the electrical starting motor to repeatedly crank and restart an internal combustion engine.

For example, the United States Council for Automotive Research LLC, based in Southfield, Mich. (USA) (website.uscar.org) has a sub-group, U.S. Advanced Battery Consortium LLC (USABC). The USABC has issued a table of Goals for Advanced Batteries for 12V Start Stop Vehicle Applications. USABC has also issued a table of USABC Goals for Advanced Electrolytes. These goals are available online at the US CAR website. It is an object of this invention to provide a solvent for a lithium salt electrolyte that will serve effectively in a 12 volt lithium-ion battery intended for start-stop vehicle operations, and in other lithium-ion battery applications requiring high power output, especially over a broad range of operating temperatures.

SUMMARY OF THE INVENTION

This invention provides liquid electrolyte formulations with balanced properties for high power lithium-ion batteries for many battery applications, especially those lithium-ion battery applications requiring high power levels, and those applications requiring high power levels from the battery over a wide range of ambient temperatures. For example, the lithium-ion cells of this invention can provide excellent power levels over a temperature range from about −30° C. to about 75° C. An example of such an application is the use of a single 12 volt lithium battery as the sole power source for start-stop engine operation in an automotive vehicle.

In one application, this invention provides liquid electrolyte formulations with balanced properties for high power 12 volt lithium-ion batteries in order to enable start-stop vehicle internal-combustion, reciprocating piston, engine operation using a single battery system for this purpose. Of course, the vehicle engine may be gasoline-fueled or diesel-fueled and be spark-ignited or compression-ignited for its combustion cycle. And the engine will have a plurality of cylinders (e.g. two to eight cylinders) and reciprocating pistons which must be set in rotational motion by the starting motor during engine starting. The starting motor must be powered to rotate the engine's pistons in their respective cylinders until combustion is initiated to power the downward strokes of the pistons. Depending on its geographical location and the season of the year, the vehicle may experience a wide range of ambient temperatures. If, for example, the battery used to for engine starting is located near the vehicle engine, under the vehicle hood in the engine compartment, the battery may experience temperatures in the range of from about −30° C. to about 75° C. And if the battery is located in the passenger compartment of the vehicle, for example under a seat, the battery may experience temperatures in the range of from about −30° C. to about 52° C.

Lithium-ion batteries presently being evaluated and considered for such vehicle start-stop operations often are formed of many interconnected electrochemical cells, each cell utilizing particles of lithium titanate ($Li_4Ti_5O_{12}$, sometimes identified as LTO in this specification) as the active material for the negative electrode (anode) during discharge of the electrochemical cell and particles of lithium manganese oxide spinel ($LiMn_2O_4$, sometimes LMO in this specification) or particles of lithium nickel manganese cobalt oxide ($LiNiMnCoO_2$, sometimes NMC in this specification)

as the positive electrode (cathode). Each of these electrode materials has the capability of intercalating and de-intercalating lithium from and into a lithium ion conducting electrolyte in the operation of each lithium-ion electrochemical cell. Physical electrical contact between the electrodes is prevented by a suitable interposed, porous polymeric separator resistant to electron flow. And the pores of each separator and electrode material are infiltrated with a suitable non-aqueous liquid electrolyte solution. The composition of the liquid electrolyte solution is important in providing suitable transport of lithium ions ($Li^+$) to obtain suitable power levels and stability in each cell over the ambient temperature range experienced by the vehicle. The electrolyte consists of a suitable lithium salt compound, such as lithium hexafluorophosphate ($LiPF_6$), lithium tetrafluoroborate ($LiBF_4$), lithium bis(trifluoromethane sulfonimide) (LiTFSI), or lithium bis(fluorosulfonyl) imide (LiFSI), dissolved in a non-aqueous solvent that enables suitable transport of lithium ions over temperature ranges that the battery and its many cells may experience in an operating vehicle. For example, the vehicle may be parked in a very cold environment, but when the vehicle is operating the battery may be heated due to its proximity to the engine. Often a one molar amount of the electrolyte salt is dissolved per liter (1.0 M) of an organic solvent.

In accordance with practices of this invention, the liquid solvent for the lithium electrolyte compound consists of a five liquid component (quinary) mixture of proportions of two cyclic alkyl carbonates, two linear alkyl carbonates, and an alkyl ester. One of the two cyclic alkyl carbonates is propylene carbonate. Each of the five constituent liquid compounds contributes its properties to the solvent mixture and to the resulting electrolyte. The properties of each individual liquid compound are not suitable to provide an electrolyte solution that will serve under the range of vehicle and battery operation conditions. But the combined properties of the proportioned five mixed liquids and the dissolved lithium salt provide for good lithium salt solubility and dissociation for higher ionic conductivity over a broad temperature range. The properties of the combined alkyl compounds and the electrolyte serve well over under hood temperatures from, for example, minus 30° C. to 75° C. that the lithium-ion battery may experience in the storage and operation of an automotive vehicle.

Lower alkyl groups such as ethyl, propyl, and butyl groups are preferred in the respective compounds. Examples of suitable cyclic carbonates include ethylene carbonate (EC), the required propylene carbonate (PC), and 1,2-butylene carbonate (BC). Examples of suitable linear alkyl carbonates include dimethyl carbonate (DMC), ethyl methyl carbonate (EMC), diethyl carbonate (DEC), and dipropyl carbonate (DPC). Suitable alkyl esters include methyl propionate (MP), ethyl propionate (EP), ethyl butyrate (EB), and methyl butyrate (MB). It is preferred that propylene carbonate constitutes 5 to 40 percent by volume of the quinary electrolyte solvent compound mixture. A second cyclic alkyl carbonate constitutes 2 to 30 volume percent of the electrolyte solvent mixture. The electrolyte solvent mixture further contains two to thirty volume percent of a suitable combination of two linear alkyl carbonates, and 30 to 80 volume percent of a suitable alkyl ester.

In accordance with practices of this invention, groups of five of these liquid compounds are used in combination with an electrolyte salt, such as lithium hexafluorophosphate ($LiPF_6$), lithium tetrafluoroborate ($LiBF_4$), lithium bis(trifluoromethane sulfonimide) (LiTFSI), or lithium bis(fluorosulfonyl) imide (LiFSI), to provide good performance over the temperature range from low ambient starting temperatures (down to −30° C.) to high vehicle engine compartment temperatures of 75° C.

Several different exemplary quinary solvent mixtures have been prepared to dissolve a one molar quantity of $LiPF_6$, $LiBF_4$, or LiFSI salts as the electrolyte for 12 V DC lithium-ion battery powered, start-stop vehicle operations. In these illustrative examples, the solvent mixtures consisted of propylene carbonate, ethylene carbonate, dimethyl carbonate, diethyl carbonate, and methyl butyl ester in volumetric proportions (v/v), respectively, of 10-20%, 5-7%, 5-7%, 5-10%, and 60-75%. The alkyl ester is used in the larger volumetric amount and the four carbonate compounds were used in lesser amounts in each quinary solvent mixture. The properties of the electrolytes formed using these quinary solvent mixtures for the lithium salt electrolyte will be described and presented in more detail below in this specification.

DESCRIPTION OF PREFERRED EMBODIMENTS

This invention uses lithium-ion battery electrode materials and a five solvent compound electrolyte solution combination specifically adapted for repeated starting of an internal combustion engine on a vehicle when the engine is to be operated in a start-stop mode. Such engines typically comprise several pistons (e.g., 4, 6, or 8) connected to a crankshaft for reciprocation in cylinders of the engine. A metered charge of hydrocarbon fuel (gasoline or diesel fuel) and a controlled amount of air are sequentially introduced into the cylinders of the engine. In present vehicles, management of the air flow and fuel injection is typically controlled by use of a one or more programmed computers. The cylinders of the engine are charged one-by-one with the air/fuel mixture. The inducted air-fuel mixture is compressed by piston action in each cylinder and ignited by a spark or by compression to drive the respective pistons and the crankshaft to which they are connected. In order to start such an engine, its crankshaft and connecting pistons must be turned using a starter motor in order to initiate air-fuel induction/injection and the ignition/combustion process. And this is done in vehicles with batteries which may be experiencing widely varying ambient or under hood temperatures (e.g., −30° C. to about 75° C.) and other ambient conditions.

The initial starting of the vehicle may be initiated by a signal from its operator. But in subsequent start-stop vehicle operation much of the ongoing engine stopping and restarting is managed using a programmed computer. When the vehicle is brought to a stop by the operator, the engine is stopped by computer initiative. And when the brake is released or the gas pedal is pushed (or a like activity), computer programmed events lead to the restart of the engine. In accordance with this disclosure, a programmed current flow from a lithium-ion battery (typically a 12 volt DC battery) over a period of a few seconds is managed and directed to power an on-vehicle electric motor for cranking the vehicle's engine. The total electric power required to start an engine depends partially on its size (piston area displacement within the cylinders). But modern engines are well lubricated and may require little variation in starting battery capacity. By way of example, 6 kW of electric power may be delivered from the battery for about 0.5 second and 4 kW of electric power for the next four seconds. This power delivery may be repeated a couple of times after a brief interval. This is a present USABC protocol for assessing the capability of a battery for use in powering engine start-stop operations. Such a power requirement may be repeatedly required during each use of a vehicle. And the battery must be capable of repeatedly delivering the required electrical starting power, regardless of the ambient environment in which the battery is used.

Figure 3A:
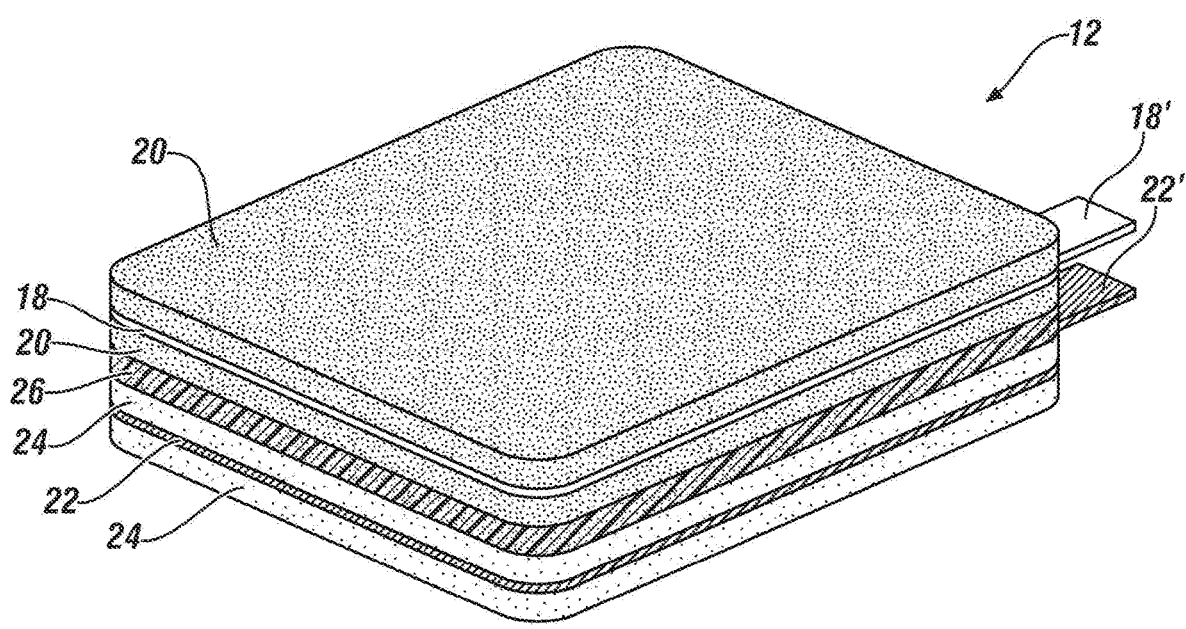
FIG. 3a is a schematic oblique view of a single cell of a lithium-ion battery in which the subject quinary liquid electrolyte solution may be used.

FIG. 3a presents an oblique, schematic illustration of a single cell 12 of a lithium-ion battery. The lithium-ion cell would be present, often with many like interconnected lithium ion cells in a suitably shaped container, not shown in the schematic view of FIG. 3a. While many lithium-ion batteries have several individual cells, interconnected in electrical series or parallel connection, each such cell has like elements and may use the quinary electrolyte solution of this invention. In FIG. 3a, lithium-ion battery cell 12 comprises two generally uniformly thick, porous layers 20 of positive battery electrode material (e.g., resin-bonded particles of lithium manganese oxide spinel), the layers 20 being bonded to opposite major sides of a carbon-coated or bare aluminum positive electrode current collector foil 18 with its uncoated connector tab 18'. Such a positive electrode is the cathode of the cell during cell discharge. Lithium ion battery cell 12 further comprises two generally uniformly thick porous layers 24 of negative electrode material (e.g., resin-bonded lithium titanate particles), the layers of negative electrode material 24 being bonded to opposite major sides of a carbon-coated or bare aluminum negative electrode current collector foil 22 with its uncoated connector tab 22'. The negative electrode material serves as the anode of the electrochemical cell during cell discharge. Positive electrode connector tab 18' and negative electrode connector tab 22' are typically electrically connected to like positive or negative electrode tabs on nearby stacked or rolled electrode members to provide a predetermined capacity and electrical potential for the lithium-ion battery.

Figure 3B:
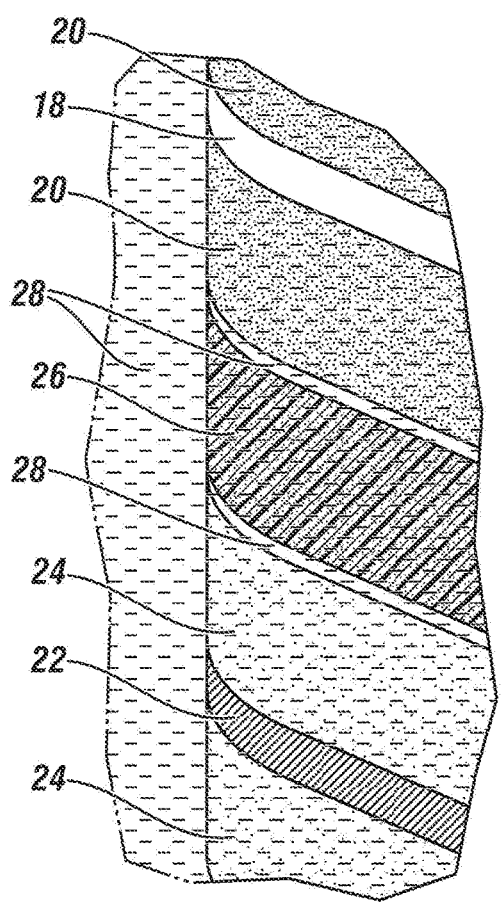
FIG. 3b is an enlarged schematic view of a portion of the lithium-ion cell of FIG. 3a, showing the presence of a subject quinary electrolyte. The lithium-ion cell and electrolyte would be contained in a suitable container (not shown). The electrolyte is actually present in the pores of the electrolyte material and the pores separator, and may be present around exterior surfaces of the cell while confined by surface of a suitable non-shown container for the lithium-ion cell.

A porous polymeric separator layer 26 is positioned between facing surfaces of a layer of positive electrode material 20 and a layer of negative electrode material 24. Separator layer 26 is sized and shaped to prevent direct physical contact between opposing electrode material layers. The pores of the separator 26 and of the layers of electrode materials 20, 24 are infiltrated and filled with the quinary electrolyte solution 28 of this invention. This is schematically illustrated in FIG. 3b which is an enlarged portion of the lithium-ion cell 12 of FIG. 3a. The schematic view of FIG. 3b is intended to show the presence of electrolyte 28 infiltrated into the pores of the electrode material layers 20, 24 and the separator 26, and between the layers and separator. As schematically illustrated in FIG. 3b, some of the quinary electrolyte solution may also lie against the outer surfaces of the cell structure 12 as it and the electrolyte 28 are confined in a suitable container, not-illustrated. The combination of a dissolved lithium electrolyte salt in the subject quinary electrolyte solution serves as the electrolyte 28 that enables the transport of lithium ions and complementary anions to and from the respective electrode material layers 20, 24 during discharging and re-charging of each cell in a lithium-ion battery.

In accordance with practices of this invention, each cell of a lithium-ion battery will employ a combination of specified lithium-intercalating anode and cathode materials and a lithium salt electrolyte dissolved in a quinary solvent mixture comprising two cyclic alkyl carbonates (propylene carbonate plus one other cyclic carbonate), two linear alkyl carbonates, and an alkyl ester. In most embodiments of this invention, the battery, when used for vehicle engine start-stop operation, will consist of five identical cells providing 12 volts of direct current electrical potential and sized to deliver the power requirements of the sole battery used for vehicle engine start-stop operation.

In general, it is preferred to use lithium manganese oxide spinel (LiMnO$_4$, LMO) as active material for the positive electrode of each lithium-ion cell in combination with lithium titanate (Li$_4$Ti$_5$O$_{12}$, LTO) as the negative electrode material. The lithium contents of these electrode materials may vary as the battery is being charged and discharged. Typically, micrometer-size particles of the electrode materials are mixed with suitable amounts of particles of a binder (e.g., poly(vinylidene fluoride), PVDF) and particles of carbon electron-conductivity enhancers (e.g., graphite, conductive carbons). The respective electrode material mixtures are bonded as porous, uniformly thick particulate layers on both sides of a compatible current collector foil. Each pair of facing porous electrode layers in a cell is separated from each other by a porous, electrically resistant separator layer. The pores of the electrode material layers and the interposed separators are infiltrated with, for example, a solution of a suitable concentration of LiPF$_6$, LiBF$_4$, or LiFSI, often a one-molar (1.0 M) solution, in a subject quinary mixture of alkyl group containing organic liquids.

LMO as the active material for a positive electrode of a Li ion battery provides excellent cycle life and rate capability over a range of ambient temperatures. The LTO as a negative electrode material enables higher power, outstanding stability, long cycle life, and excellent low temperature performance. And the combination of LMO/LTO as the electrode materials is found to provide low internal impedance, long cycle life, and stability during repeated discharge and charging cycling over short time periods as a vehicle engine is repeatedly stopped and re-started. The respective electrode materials are often used in the form of small particles which are resin-bonded as a porous electrode layer to each other and to a face of a compatible current collector foil.

The LMO/LTO positive electrode-negative electrode combination is compatible with the many lithium-containing electrolyte materials and non-aqueous solvents for these electrolyte compounds. Moreover, the LMO/LTO electrode combination, due to its reduced operating voltage window (of about two volts or so per cell) as compared to other lithium ion batteries, enables the use of electrolyte solvents such as the subject quinary solvent mixtures of lower freezing points (e.g., for electrolyte solution operation below about −30° C.) and viscosities than the present Li-ion battery systems used for electric motor powered vehicles. Finally, the expected long cycle life is due to the fact that both LMO and LTO operate at potentials (4.0 and 1.5 V vs. Li/Li+, respectively) safely within the stability window of common lithium-ion battery electrolytes.

A very important constituent of each cell is the quinary solvent for the lithium electrolyte salt. As stated above in this specification, the liquid solvent for the lithium electrolyte compound consists of a five liquid component (quinary) mixture of proportions of propylene carbonate (PC) plus one additional cyclic alkyl carbonate, two linear alkyl carbonates, and an alkyl ester. Each of the five liquid compound constituents contributes its properties to the solvent mixture and to the resulting electrolyte. The properties of each individual liquid compound are not suitable to provide an electrolyte solution that will serve under the range of vehicle and battery operation conditions.

Examples of suitable individual cyclic alkyl carbonates include the required propylene carbonate (PC) plus one of ethylene carbonate (EC) and butylene carbonate (BC). Physical properties of EC and PC relevant to their use as a solvent component are presented in the following Table 1. Examples of suitable individual linear alkyl carbonates include dimethyl carbonate (DMC), ethyl methyl carbonate (EMC), diethyl carbonate (DEC), methyl propyl carbonate (MPC), ethyl propyl carbonate (EPC), and dipropyl carbonate (DPC). Physical properties of DMC, EMC, and DEC relevant to their use as a solvent component are presented in the following Table 1. And examples of suitable individual alkyl esters include ethyl acetate (EA), methyl propionate (MP), ethyl propionate (EP), methyl butyrate (MB), ethyl butyrate (EB), propyl butyrate (PB), and butyl butyrate (BB). Again, physical properties of these esters, relevant to their use as a solvent component are presented in the following Table 1.

TABLE 1

| Solvents | Dielectric constant ε at 25° C. | Viscosity cP at 25° C. | Melting point (m.p.) ° C. | Boiling Point (b.p.) ° C. |
| --- | --- | --- | --- | --- |
| EC | 89.78 | 1.90 (40° C.) | 36.4 | 248 |
| PC | 64.92 | 2.53 | −48.8 | 242 |
| DMC | 3.11 | 0.58 | 4.6 | 91 |
| EMC | 2.96 | 0.65 | −53 | 110 |
| DEC | 2.81 | 0.75 | −74.3 | 126 |
| EA | 6.02 | 0.45 | −84 | 77 |
| MP | 6.20 | 0.50 | −87.5 | 79.8 |

TABLE 1-continued

| Solvents | Dielectric constant ε at 25° C. | Viscosity cP at 25° C. | Melting point (m.p.) ° C. | Boiling Point (b.p.) ° C. |
| --- | --- | --- | --- | --- |
| EP | 5.70 (20° C.) | 0.90 | −73.9 | 99.1 |
| MB | 5.48 | 0.54 | −85.8 | 102.8 |
| EB | 5.18 | 0.64 | −93 | 120 |
| PB | 4.30 (20° C.) | 0.83 | −95.2 | 142.7 |
| BB | | 0.98 | −91.5 | 164 |

It has been experimentally determined that certain quinary combinations of these individual liquid compounds serve as good solvents (often 1.0 M solutions) for lithium electrolyte salts such as $LiPF_6$, $LiBF_4$, LiTFSI, or LiFSI. Stated generally, it is preferred to use a quinary solvent combination of 5 to 40 percent by volume of propylene carbonate (PC) and 2 to 30 percent by volume of a second cyclic alkyl carbonate, 2-30 percent by volume of two linear alkyl carbonates, and 30 to 80 percent by volume of an alkyl ester.

Propylene carbonate is required as a constituent of the total quinary solvent mixture. The second liquid cyclic alkyl carbonate may, for example, be one of ethylene carbonate and butylene carbonate. The combination of two liquid linear alkyl carbonates may, for example, be selected from the group of dimethyl carbonate, ethyl methyl carbonate, diethyl carbonate, and propyl methyl carbonate. The alkyl ester may, for example be one of methyl propionate, ethyl propionate, methyl butyrate, ethyl butyrate, propyl butyrate, and butyl butyrate.

The combinations are selected to provide a durable electrolyte solution that provides suitable conductivity and durability to its lithium-ion cell to enable repeated engine start-stop vehicle operation over a vehicle (and engine compartment) ambient temperature range from about −30° C. to about 75° C. One requirement of the solvent mixture is to provide ionic conductivity of a one-molar solution of the lithium-based electrolyte of at least two millisiemens per centimeter (2.0 mS/cm) at −30° C. Another requirement is to provide the cells of the battery with stability over many starting cycles when operating in or near a vehicle passenger compartment experiencing a temperature of about 45° C.

The following exemplary five-component solvent mixtures of this invention provide suitable electrolyte (1.0 M $LiPF_6$) conductivities over the required broad temperature range.

Electrolyte SSE-05 consists of 1.0 M $LiPF_6$ in a quinary mixture of cyclic propylene carbonate (PC): cyclic ethylene carbonate (EC): linear dimethyl carbonate (DMC): linear diethyl carbonate (DEC): and methyl butyrate ester (MB) in volumetric proportions 19:7:7:7:60 (v/v).

Electrolyte SSE-06 consists of 1.0 M $LiPF_6$ in PC:EC:DMC:DEC:MB (20:5:5:10:60, v/v).

Electrolyte SSE-07 consists of 1.0 M $LiPF_6$ in PC:EC:DMC:DEC:MB (10:5:5:5:75, v/v).

Electrolyte SSE-08 consists of 1.0M $LiPF_6$ in PC:EC:DMC:DEC:MB (15:5:5:5:70, v/v).

The following electrolyte solutions were prepared for purposes of comparative testing.

Comparative commercial electrolyte solution Example A consists of 1.0 M $LiPF_6$ in EC: ethyl methyl carbonate (EMC):EA (1:5:4, v/v).

Comparative commercial electrolyte solution Example B consists of 1.0 M $LiPF_6$ in PC:EMC:carbonate A.

Comparative Example SSE-01 consists of 1.0 M $LiPF_6$ in PC:EMC:MB (1:1:3, v/v).

Comparative Example SSE-02 consists of 1.0 M LiPF$_6$ in PC:EMC:MB (1:1:8, v/v).

The ionic conductivities (mS/cm) of these electrolytes at 25° C., 0° C., and −30° C. are presented in the following Table 2.

TABLE 2

| Electrolyte | 25° C. (mS/cm) | 0° C. (mS/cm) | −30° C. (mS/cm) |
|---|---|---|---|
| Example A | 9.80 | 5.84 | 1.97 |
| SSE-01 | 8.83 | 5.65 | 2.12 |
| SSE-02 | 8.29 | 5.44 | 2.24 |
| SSE-05 | 8.38 | 6.22 | 2.66 |
| SSE-06 | 8.86 | 7.28 | 2.69 |
| SSE-07 | 8.96 | 6.95 | 2.70 |
| SSE-08 | 8.84 | 5.55 | 2.80 |
| Example B | 9.98 | 6.35 | 2.80 |

These comparative conductivity values are considered to demonstrate that the quinary solvent electrolytes (SSE-05 through SSE-08) have more balanced properties than the comparative samples SSE-01 and SSE-02. The quinary solvent mixture electrolyte samples provide better conductivity values at −30° C. than commercial sample, Example A. The four quinary solvent mixture electrolyte samples match another commercial sample, Example B, with respect to conductivity at −30° C. And as will be shown, exceed the durability of Example B at higher cell operating temperatures, such as 45° C.

Some of the 1.0 M LiPF$_6$ quinary-solvent, electrolyte solutions and some of the comparative electrolyte solutions were individually incorporated into identical lithium-ion cells for evaluation in cold cranking tests for evaluation of their potential in vehicle engine start-stop operations. Each cell was sized and prepared to provide 13 mAh of DC electrical energy. The cold cranking test on each cell was conducted in accordance with the US Advanced Battery Consortium (USABC) protocol for battery compositions and structures prepared for engine start-stop operation.

The USABC Cold Cranking Test protocol is intended to measure the 4.5-s power capability at low temperature (normally −30° C.) of the battery. The Cold Cranking Test profile is a literal implementation of the Cold Cranking Power targets, which require the capability to provide 6-kW of discharge power for 0.5 second followed by 4-kW for 4 seconds for a total of three 4.5-s pulses at 14.5-s intervals (i.e., 10 s between pulses.). For LMO/LTO start/stop cells, the minimum voltage should be higher than 1.6 V during every pulse and its pulse power level to be used is 6-kW and 4-kW divided by a calculated Battery Size Factor (BSF). The protocol assumes the use of a 40 Ah capacity battery pack. Since the subject test cells were each of 13 mAh discharge power, it was necessary to calculate the pulse power in proportion of the test cell size to the 40 Ah capacity battery pack. At 80% SOC, 13 mAh cells can provide typical 12.5 mAh capacity. The battery will consist of five identical cells, each providing 12.5 mAh capacity. So BSF equals 16,000, calculated as follows: 40 Ah×1000 mAh per Ah×5 cells/12.5 mAh=16,000. To deliver 6 kW of discharge power for 0.5 second, each cell should deliver 0.375 W (6000/16000=0.375). To deliver 4 kW of discharge power for 4.0 seconds, each cell should deliver 0.25 W (4000/16000=0.25).

Further details of the USABC Energy Storage System Performance Targets for 12 Volt Start/Stop Vehicles may be found at the USABC web site.

The cells were each soaked at −30° C. for more than 6 hrs. Each cell was then placed in a computer controlled electrical circuit to measure and record an initial voltage (at −30 C) and the output voltage of the cell during pulse tests characterized by a holding period of about five seconds, a withdrawal of 6 kW for 0.5 second, a 4 kW withdrawal for 4 seconds followed by a ten second interval. The interval was followed by two like power withdrawal cycles.

Figure 1:
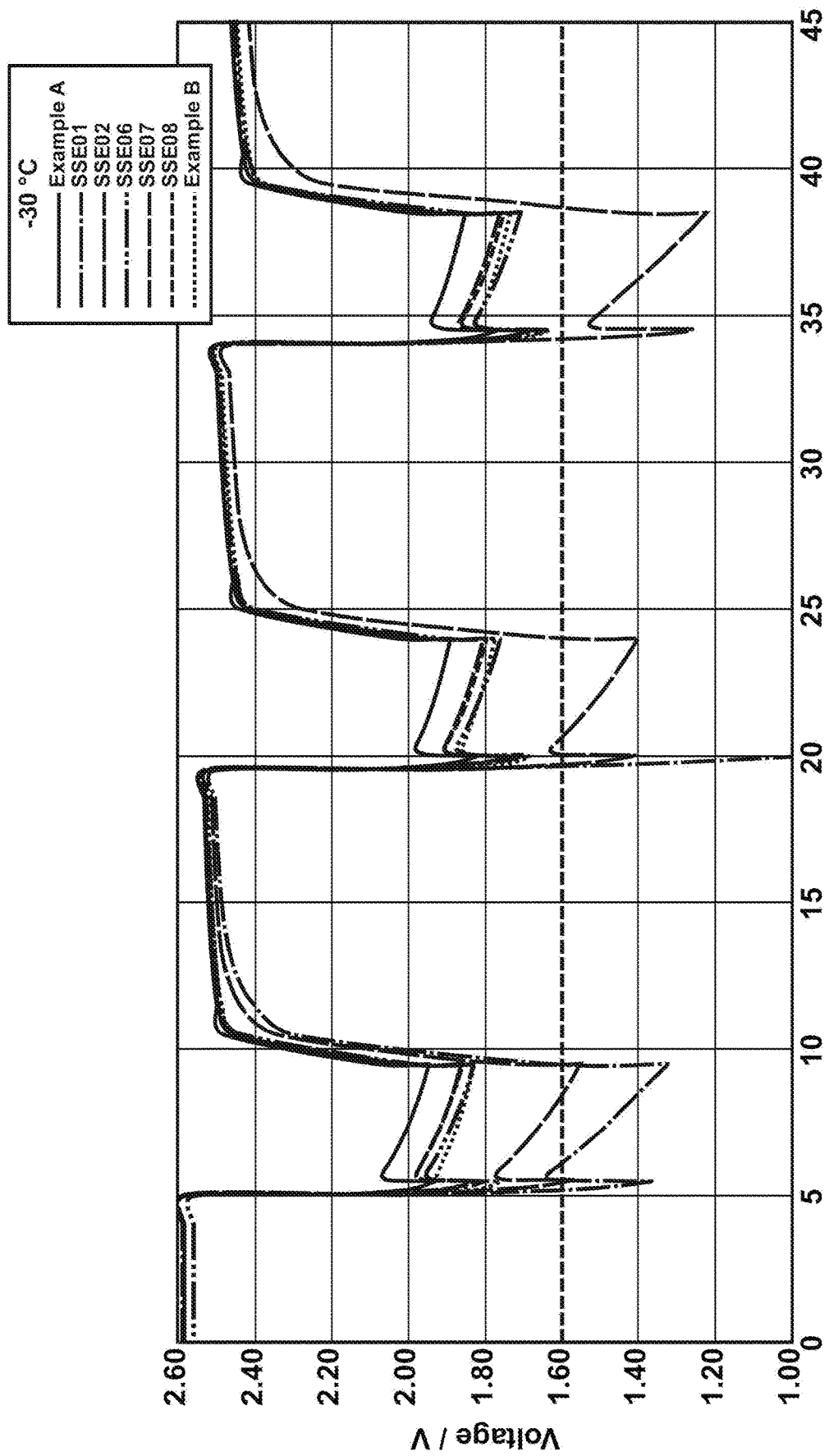
FIG. 1 is a graph of instantaneous voltage (V) versus test time in seconds (s) for a pulse test at −30° C. conducted on a group of identical 13 mAh capacity single-layer LTO/LMO cells, each at an initial 80% state of charge (SOC), using seven different electrolyte solutions, each 1.0 M $LiPF_6$ in a different combination of solvents. Some of the solvents are the subject quinary solvents and others are used as comparative examples. Each pulse test procedure was based on present USABC Protocol for engine start-stop operation and consisted of a constant power draw of 6 kW for 0.5 second, followed by a constant power draw of 4 kW for 4 seconds. After a recovery period of ten seconds the pulse test was repeated twice on the cell in its cold environment. The power draws using the 13 mAh test cells were proportional to the use of a 40 Ah battery pack that is considered suitable for such start-stop applications. The solvent mixtures used in forming the electrolyte solutions are described below in this specification.

FIG. 1 is a graph presenting the voltage data versus time (in seconds) obtained over the three cycles of 0.5 s/4 s discharges and 10 s intervals. The respective data curves are: comparative electrolyte Example A (solid graph line), SSE-01 (dash dot line), SSE-02 (long dash line), SSE-06 (long dash dot dot line), SSE-07 (medium dash line), SSE-08 (short dash line), and comparative electrolyte Example B (square dot line).

As expected, the respective voltage (V) versus time (s) curves for each of the cells dropped during current withdrawal. The subject quinary-solvent electrolyte cells SSE-06, SSE-07, and SSE-08 performed well. They performed much better at the low temperature (−30° C.) than the three-solvent electrolytes, SSE-01, SSE-02, and comparative electrolyte Example B.

Many of the same cell assemblies were also subjected to high temperature stability tests. Typically, fresh cells provide good starting power at higher temperatures, but there is a tendency with some electrolytes to lose capacity over prolonged operation at higher ambient and under-hood temperatures.

Figure 2:
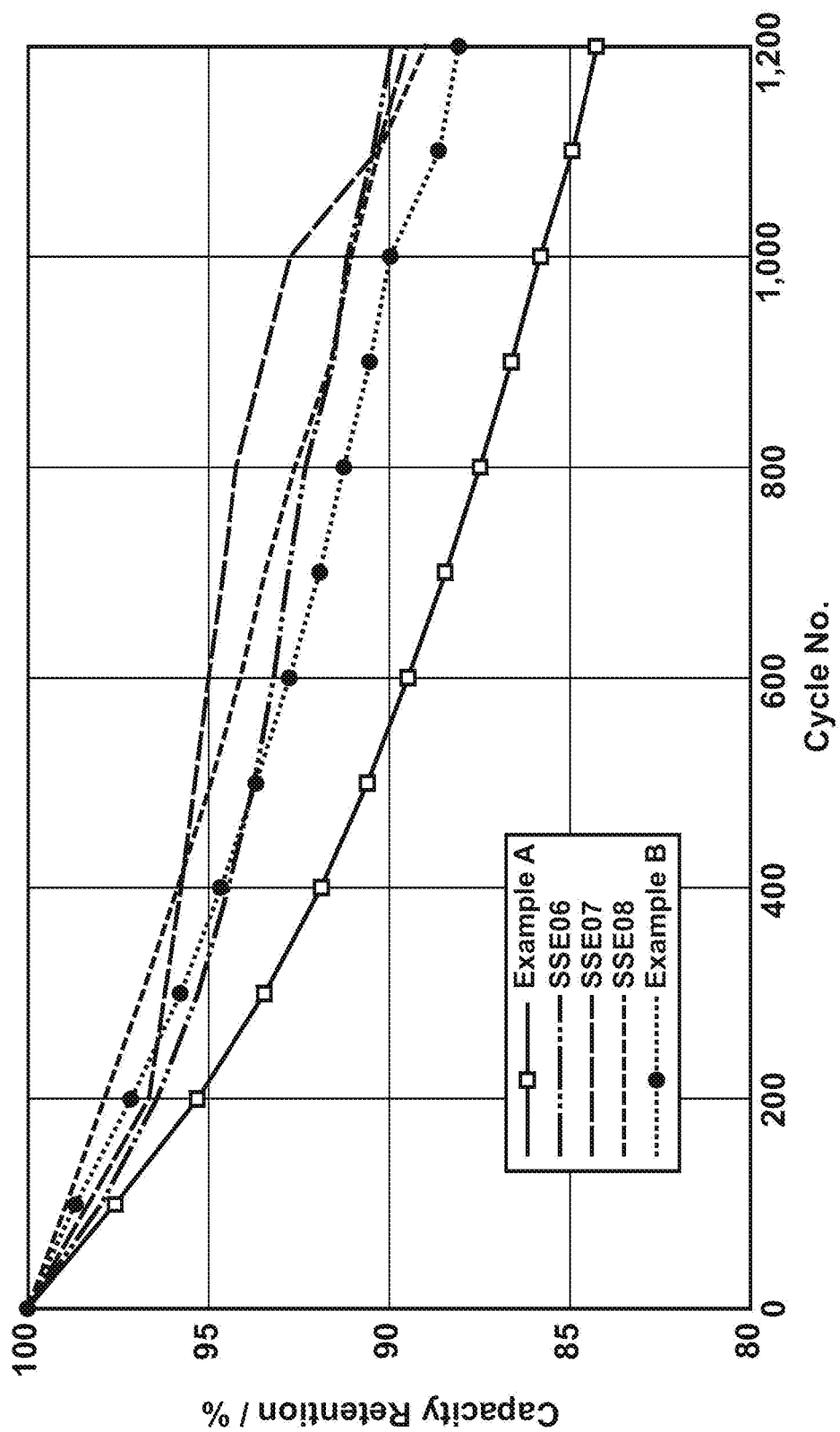
FIG. 2 is a graph of percent capacity retention (%) versus cycle number for 5 C charge/10 C discharge cycles at 45° C., conducted on a group of identical 13 mAh capacity single-layer LTO/LMO cells, each at an initial 80% state of charge (SOC), using five different electrolyte solutions, each 1.0 M $LiPF_6$ in a different combination of solvents. The solvent mixtures used in forming the electrolyte solutions are described below in this specification.

FIG. 2 presents determined capacity retention percentages for five 13 mAh, single layer, LMO/LTO lithium ion cells, over repeated discharge cycles, with their respective electrolyte solutions. Again, the respective cells were formed to be substantially identical except for the solvents that contained the LiPF$_6$ electrolyte salt at 1.0 M concentration. The five different electrolyte solvents were, respectively, comparative electrolyte Examples A and B, and quinary electrolyte solutions of the subject invention: SSE06, SSE07, and SSE08. The cells were repeatedly charged at 5 C and discharged at 10 C (where 1 C refers to a full charge for the cell electrodes in one hour).

As demonstrated in the data of FIG. 2, the subject quinary solvent electrolyte cells performed better in capacity retention at 45° C. than the comparative Example A cells and equivalent to or better than the Example B cells. The identifying characteristics of the capacity retention data lines for the respective solvents are indicated in the Box in FIG. 2. When the operation of the lithium-ion cells is considered at both −30° C. and 45° C., it is seen that the subject quinary solvents for the electrolyte salt perform very well over potential temperature ranges that may be experienced by automotive vehicles using start-stop engine operating modes.

Thus, a quinary liquid solvent mixture of propylene carbonate, one additional cyclic alkyl carbonate, two linear alkyl carbonates, and an alkyl ester is provided for dissolution of a lithium salt that is to be used as the electrolyte solution in a 12 V DC lithium-ion battery. Such an electrolyte solution provides good lithium ion conductivity and electrolyte durability in such a lithium ion battery that is to be used as the sole electrical power source for engine starting in a vehicle that is to be operated in engine start-stop mode. Such an electrolyte solution likewise provides good lithium ion conductivity and electrolyte durability in such a lithium ion battery that is to be used in other high power requiring applications, especially when such requirements

The invention claimed is:

1. A 12-volt lithium-ion battery comprising a plurality of electrochemical cells, each cell having a lithium-containing positive electrode material consisting essentially of one of lithium manganese oxide spinel (LiMn2O4) and lithium nickel manganese cobalt oxide (LiNiMnCoO2), a lithium-containing negative electrode material consisting essentially of lithium titanate (Li4Ti5O12), a lithium-based electrolyte salt, and a non-aqueous five-component electrolyte solvent;
the electrolyte solvent consisting of five to forty percent by volume of propylene carbonate, two to thirty percent by volume of one additional cyclic alkyl carbonate, two to thirty percent by volume of two linear alkyl carbonates, and thirty to eighty percent by volume of an alkyl ester, the electrical conductivity of a one-molar solution of the lithium-based electrolyte salt in the five-component solvent mixture being at least two millisiemens per centimeter (2.0 mS/cm) at −30° C.

2. The lithium-ion battery of claim 1 wherein the two cyclic alkyl carbonates are propylene carbonate and one additional cyclic alkyl carbonate selected from the group consisting of ethylene carbonate, propylene carbonate, and butylene carbonate.

3. The lithium-ion battery of claim 1 wherein the two linear alkyl carbonates are selected from the group consisting of dimethyl carbonate, diethyl carbonate, methyl ethyl carbonate, methyl propyl carbonate, ethyl propyl carbonate, and dipropyl carbonate.

4. The lithium-ion battery of claim 1 wherein the alkyl ester is selected from the group consisting of methyl propionate, ethyl propionate, methyl butyrate, ethyl butyrate, propyl butyrate, and butyl butyrate.

5. The lithium-ion battery of claim 1 in which the lithium-based electrolyte salt is selected from the group consisting of lithium hexafluorophosphate, lithium tetrafluoroborate, lithium bis(trifluoromethane sulfonimide), and lithium bis(sulfonyl) imide.

6. The lithium-ion battery of claim 1 in which the electrolyte solvent consists of propylene carbonate, ethylene carbonate, dimethyl carbonate, diethyl carbonate, and methyl butyl ester in volumetric proportions (v/v), respectively, of 10-20%, 5-7%, 5-7%, 5-10%, and 60-75%.

7. A 12-volt lithium battery for use in an automotive vehicle, the automotive vehicle comprising a reciprocating piston, internal combustion engine, a computer based engine control system programmed to stop the engine when the operator brings the vehicle to a stop and to re-start the engine when the operator seeks to set the vehicle in motion, an electrically powered motor for starting the engine, and a lithium-ion battery for powering the motor and the starting of the engine:
the lithium-ion battery comprising a plurality of electrochemical cells, each cell having a lithium-containing positive electrode material consisting essentially of one of lithium manganese oxide spinel (LiMn2O4) and lithium nickel manganese cobalt oxide (LiNiMnCoO2), a lithium-containing negative electrode material consisting essentially of lithium titanate (Li4Ti5O12), a lithium-based electrolyte salt, and a non-aqueous five-component electrolyte solvent, the electrolyte solvent consisting of;
five to forty percent by volume of propylene carbonate, two to thirty percent by volume of one additional cyclic alkyl carbonate, two to thirty percent by volume of two linear alkyl carbonates, and thirty to eighty percent by volume of an alkyl ester, the electrical conductivity of a one-molar solution of the lithium-based electrolyte salt in the five-component solvent mixture being at least two millisiemens per centimeter (2.0 mS/cm) at −30° C.

8. The lithium-ion battery of claim 7 wherein the two cyclic alkyl carbonates are propylene carbonate and one additional cyclic alkyl carbonate selected from the group consisting of ethylene carbonate, propylene carbonate, and butylene carbonate.

9. The lithium-ion battery of claim 7 wherein the two linear alkyl carbonates are selected from the group consisting of dimethyl carbonate, diethyl carbonate, methyl ethyl carbonate, methyl propyl carbonate, ethyl propyl carbonate, and dipropyl carbonate.

10. The lithium-ion battery of claim 7 wherein the alkyl ester is selected from the group consisting of methyl propionate, ethyl propionate, methyl butyrate, ethyl butyrate, propyl butyrate, and butyl butyrate.

11. The lithium-ion battery of claim 7 in which the lithium-based electrolyte salt is selected from the group consisting of lithium hexafluorophosphate, lithium tetrafluoroborate, lithium bis(trifluoromethane sulfonimide) and lithium bis(sulfonyl) imide.

12. The lithium-ion battery of claim 7 in which the electrolyte solvent mixture consists of propylene carbonate, ethylene carbonate, dimethyl carbonate, diethyl carbonate, and methyl butyl ester in volumetric proportions (v/v), respectively, of 10-20%, 5-7%, 5-7%, 5-10%, and 60-75%.

13. An automotive vehicle comprising a reciprocating piston, internal combustion engine, a computer based engine control system programmed to stop the engine when the operator brings the vehicle to a stop and to re-start the engine when the operator seeks to set the vehicle in motion, an electrically powered motor for starting the engine, and a 12-volt lithium-ion battery for powering the motor and the starting of the engine:
the lithium-ion battery comprising a plurality of electrochemical cells, each cell having a positive electrode material consisting essentially of one of lithium manganese oxide spinel (LiMn2O4) and lithium nickel manganese cobalt oxide (LiNiMnCoO2), a negative electrode material consisting essentially of lithium titanate (Li4Ti5O12), a lithium-based electrolyte salt, and a non-aqueous five-component electrolyte solvent, the electrolyte solvent consisting of;
five to forty percent by volume of propylene carbonate, two to thirty percent by volume of one additional cyclic alkyl carbonate, two to thirty percent by volume of two linear alkyl carbonates, and thirty to eighty percent by volume of an alkyl ester, the electrical conductivity of a one-molar solution of the lithium-based electrolyte salt in the five-component solvent mixture being at least two millisiemens per centimeter (2.0 mS/cm) at −30° C.

14. The automotive vehicle of claim 13 wherein the two cyclic alkyl carbonates are propylene carbonate and one additional cyclic alkyl carbonate.

15. The automotive vehicle of claim 13 wherein the two cyclic alkyl carbonates are propylene carbonate and one additional cyclic alkyl carbonate selected from the group consisting of ethylene carbonate, propylene carbonate, and butylene carbonate.

16. The automotive vehicle of claim 13 wherein the two linear alkyl carbonates are selected from the group consisting of dimethyl carbonate, diethyl carbonate, methyl ethyl carbonate, methyl propyl carbonate, ethyl propyl carbonate, and dipropyl carbonate.

17. The automotive vehicle of claim 13 wherein the alkyl ester is selected from the group consisting of methyl propionate, ethyl propionate, methyl butyrate, ethyl butyrate, propyl butyrate, and butyl butyrate.

18. The automotive vehicle of claim 13 in which the lithium-based electrolyte salt is selected from the group consisting of lithium hexafluorophosphate, lithium tetrafluoroborate, lithium bis(trifluoromethane sulfonimide), and lithium bis(sulfonyl) imide.

* * * * *